April 28, 1931.  C. C. WORTHINGTON  1,802,746
LAWN MOWER-CUTTER RELEASE
Filed Oct. 24, 1928
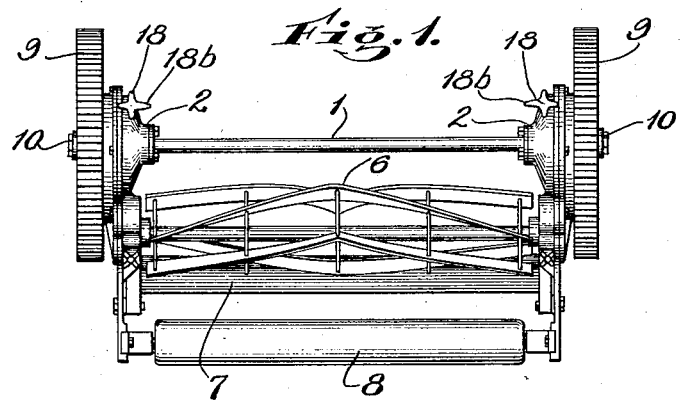
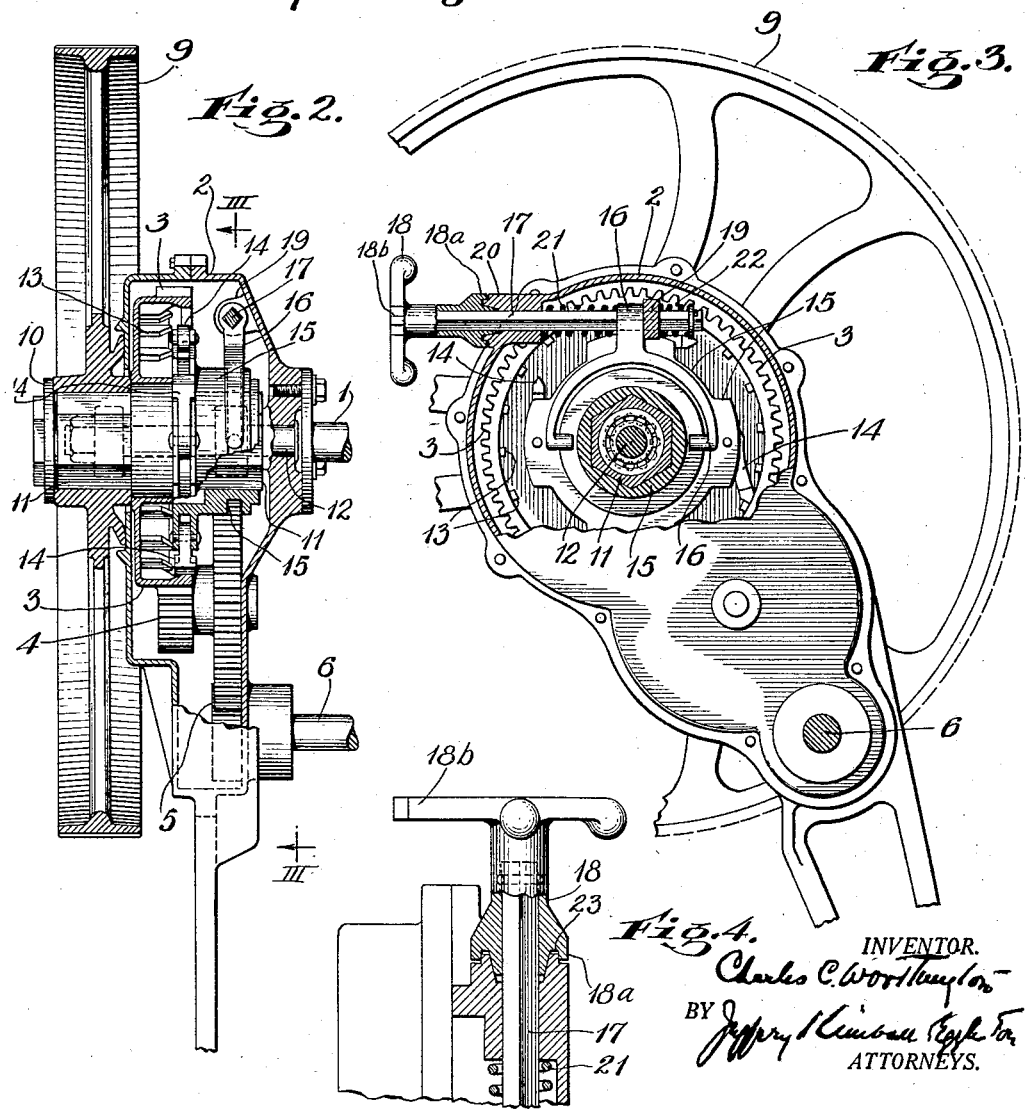
INVENTOR.
Charles C. Worthington
BY
ATTORNEYS.

Patented Apr. 28, 1931

1,802,746

UNITED STATES PATENT OFFICE

CHARLES C. WORTHINGTON, OF DUNFIELD, NEW JERSEY

LAWN-MOWER-CUTTER RELEASE

Application filed October 24, 1928. Serial No. 314,555.

The invention is an improved releasing device for disengaging the ground wheels of lawn mowers from their normal driving relation to their fly knives, and its object is the simplification and general improvement of such devices as hereinafter pointed out.

The preferred form of the invention is shown in the accompanying drawing by way of exemplification of the principles involved, Fig. 1 being a top plan view of a lawn mower with such form applied. Fig. 2 a horizontal section through one of the gear casings, with parts broken away, Fig. 3 a section on line III—III and Fig. 4 a detail.

The invention is applicable to any of the common designs of lawn mowers. The one shown comprises a frame consisting of a cross rod 1 which rigidly unites the two side members 2, one or both of which is formed as an enclosure or casing to house the gear train and ratchet mechanism by which the ground wheel drives the fly knife. Such train comprises the gears marked 3, 4 and 5 in the usual arrangement, the latter of which is directly keyed to the fly knife 6. The ledger knife 7 and the rear roller 8 are mounted in the side casings as usual. The ground wheel 9 is held by its cap screw 10 on the exterior end of a hub 11 of polygonal or hexagonal cross section, which hub is journalled by ball bearings or otherwise on a stub shaft 12 fixed inside the casing being permanently secured in the inner wall thereof. The casing is intended to hold a body of oil for the long time lubrication of the gears and to prevent escape of such oil, the casing side wall is arranged to make a close junction with the hub part of the ground wheel as indicated, which junction also excludes dirt and dust from the interior. The main drive gear 3 of the gear train is idly journalled, within the casing, on a cylindrical part of the otherwise hexagonal hub 11 and is internally formed with a ring of ratchet teeth 13 adapted to be engaged by one or more of the drive pawls 14 carried on a clutch collar 15, which latter is slidingly mounted on the inner end of the hexagonal part of the hub 11, being non-rotatable thereon. The ground wheel drives the hub and clutch collar and the latter, through the pawls, drives gear 3 and the rest of the train as will be understood.

The releasing device of this invention is specifically a means for sliding this pawl-carrying clutch collar back and forth on the hub, so that in one position the pawls will be in the plane of the ratchet teeth and adapted to engage them, and in the other position will be out of line with such teeth, in the open position indicated in Fig. 2. In the present case, such device comprises a shifter fork 16 engaged in a circumferential groove in the clutch collar and provided with a square or angular hole in its head part, by which it is mounted on, and operated by a square or angular sectioned spindle 17. This spindle is preferably arranged in a vertical position in the front part of the gear casing forward of the cross rod 1, although it might be otherwise placed and it extends through a round hole in the top wall of the casing where it is furnished with an exterior enlargement 18 which may be and preferably is the handle by which it is rotated. Such rotation swings the clutch or pawl shifter from one position to the other, thus connecting and releasing the fly knife gear train from the ground wheel.

The spindle 17 is journalled at its inner end in a round hole formed in an inwardly projecting lug 19 on the interior casing wall; its other journal is provided by the hole through the casing which is bossed for the purpose as shown at 20. A spring 21 surrounding the spindle between the boss and the shifter fork presses the head of the latter against the interior fixed lug 19, thus establishing the position of the shifter with relation to other parts, while a second spring 22, interposed between the fixed lug 19 and a washer pinned to the extreme end of the spindle 17 serves to draw the latter inwardly or downwardly so as to engage the bottom part of its exterior shoulder enlargement or handle 18 against the top part of the boss 20. This produces and maintains a tight joint between these parts which not only prevents entry of dust or grit into the interior of the casing but also furnishes a desirable degree of friction for the spindle sufficient to hold the shifter in either position to which it has been set. The dust-excluding and also the friction-producing function of the joint is promoted by coning the meeting surfaces of the handle and boss as indicated and also by providing the handle with a skirt flange or rim 18a which embraces the boss or fits a circular rebate in it as shown more clearly in Fig. 4. In the event that the friction created by the spring 22, augmented by rust or the like, should prove too much to be easily overcome by simple turning, a slight upward pull on the spindle will free it entirely, thus making the operation easy and permitting a smaller handle for the spindle than would otherwise be necessary.

Assembly of the several parts consists merely in passing the spindle through the boss, shifter head, lug 19 and the spring means and then pinning on the washer, and this, as will be obvious, can be very quickly done. The spindle need not be square or angular throughout its length, or where it is journalled in the casing, except that by such arrangement it is more cheaply produced, ordinary square stock being thus available and needing no machining and since in any event the spring-maintained joint protects the hole through which the spindle passes, so that dirt and water are safely excluded. Although the handle constitutes a convenient means of producing the joint referred to, it will be understood that the joint-forming shoulder can be otherwise located on the spindle while still co-operating with the gear casing to give the effect described. Preferably the handle is provided with an index member or pointer 18b so arranged that when it is turned so that the index member points directly inward, as shown in Fig. 1, the clutch collar will be engaged to the gear wheel and when pointed in another direction will indicate that the cutter is released. As above stated, the spindle is preferably vertical and located in the forward upper part of each gear casing, so that the operating handles thus occupy high positions on the mower, nearly as high as the tops of the ground wheels. In such position the indexes are easily noticeable by the operator who can thus tell at a glance whether both clutches are closed and thereby more readily avoid the use of the mower when only one gear train is active. This arrangement is found in practice to constitute a practical means of doing away with the complication of interconnecting linkage between the two shifters for causing their joint operation and saves the weight of such parts which is an important item where the mowers are operated in power-propelled gangs as intended for the case in hand.

Referring again to the springs 21 and 22, it is not essential that there be two springs as shown, since by locating the fixed stud 19 on the opposite side of the head of the shifter fork, the spring 22 can be easily made to serve also the function of spring 21, that is to say, to hold the shifter against said fixed lug as well as to draw the spindle inwardly or downwardly to make the tight joint.

Claims:

1. In a lawn mower, a cutter release comprising, in combination with the gear casing containing a clutch shifter, a rotary shifter spindle within the casing having one end extended to the exterior and provided with an exterior shoulder, and a spring acting on the spindle within the casing to draw the shoulder to a tight joint with the casing.

2. In a lawn mower, a cutter release comprising a clutch shifter within the mower gear-casing, a rotary operating spindle therefor, a spring urging the spindle in an endwise direction and conical engaging surfaces on said spindle and casing pressed together by said spring to form a tight joint.

3. In a lawn mower, a cutter release comprising a shifter, a rotary operating spindle therefor slidingly engaging the same and a spring pressing the shifter lengthwise of the spindle and holding it against a fixed part.

4. In a lawn mower, the combination of a closed gear casing, a clutch shifter positioned therein by engagement with a fixed part of the casing, a rotary spindle non-rotatably but slidingly engaged to said shifter and extending to the exterior of the casing, a shoulder on the spindle and spring means on the spindle for pressing said shoulder to a tight joint with the casing and the shifter against said fixed part.

5. In a lawn mower, a closed gear casing containing a clutch shifter, a rotary operating spindle slidingly engaged to the shifter head and extending to the exterior of the gear casing, a shoulder on said spindle, and spring means for maintaining both said shifter head and shoulder in engagement with fixed parts of the structure.

6. In a lawn mower, a cutter release comprising an angularly-sectioned spindle passing through and journalled in a round hole in the wall of the gear casing, in combination with an enlargement on the spindle overlying said hole outside of the casing.

7. In a lawn mower having a gear casing, a cutter release comprising an upright spindle extending vertically through a hole in the top wall of said gear casing, a shifter-fork within the casing operated by the spindle, an exterior vertical handle on the spindle, a skirt therefor protecting said hole, a seat for the handle on the casing and a spring within the casing urging the handle into engagement with said seat with a degree of pressure sufficient to prevent accidental movement of the shifter fork.

8. In a lawn mower, a cutter release comprising, in combination with a closed gear casing, a shifter and an upright spindle therefor within the casing, an exterior handle on the spindle and a spring within the casing pressing the handle downwards to seat on and make a tight friction joint with the casing, and a skirt associated with the handle to keep water out of the casing.

9. In a lawn mower having a rotary fly-knife, the combination with the closed gear casings thereof, of a clutch collar in each casing each adapted to engage and disengage the fly-knife and having a shifter fork for such purpose, a rotary operating spindle for each shifter fork journalled vertically in the upper front parts of the casings, and projecting through the top walls thereof with handles on said spindles upstanding above the adjacent parts of the casing, said handles being provided with index members adapted to show by their position the position of the clutch collars, and having means to deflect water from entering the casings through the holes through which such handles control said forks.

In testimony whereof, I have signed this specification.

CHAS. C. WORTHINGTON.